United States Patent Office 2,856,416
Patented Oct. 14, 1958

2,856,416

RING A BROMINATED INTERMEDIATES AND PROCESS OF PREPARING 1,4-PREGNADIENE-11β,17α,21-TRIOL-3,20-DIONE

David Taub, Metuchen, and Norman L. Wendler, Summit, N. J., assignors to Merck & Co., Inc., Rahway, N. J., a corporation of New Jersey No Drawing. Application February 29, 1956
Serial No. 568,446

19 Claims. (Cl. 260—397.45)

This invention is concerned generally with novel steroid compounds and with processes of preparing them. More particularly, it relates to a novel method of preparing 1,4-pregnadiene-11β,17α,21-triol-3,20-dione and its 21-esters, starting with 1-pregnene-11β,17α,21-triol-3,20-dione 21-acylate, and with the new intermediate compounds thus obtained. The 1,4-pregnadiene-11β,17α,21-triol-3,20-dione and its 21-esters possess cortisone activity but differ from cortisone in not possessing appreciable sodium or water retention action. They are thus especially effective in the treatment of arthritis and related diseases since they can be administered for their cortisone action without producing the undesired metabolic effects such as edema, which are caused by the sodium and water retention action of cortisone.

In accordance with our novel method, 1-allopregnene-11β,17α,21-triol-3,20-dione 21-acylate (Compound 1 hereinbelow) is reacted with approximately two molecular equivalents of bromine to form 1,2,2-tribromo-allopregnane-11β,17α,21-triol-3,20-dione 21-acylate (Compound 2) which, upon heating in solution in an organic acid, rearranges to form 1,2,4-tribromo-allopregnane-11β,17α,21-triol-3,20-dione 21-acylate (Compound 3). The latter compound is reacted with an alkali metal iodide to produce 4-bromo-1-allopregnene-11β,17α,21-triol-3,20-dione 21-acylate (Compound 4) which is reacted with an organic base, preferably in the presence of lithium chloride, thereby forming 1,4-pregnadiene-11β,17α,21-triol-3,20-dione 21-acylate (Compound 5). The reactions indicated hereinabove may be chemically represented as follows:

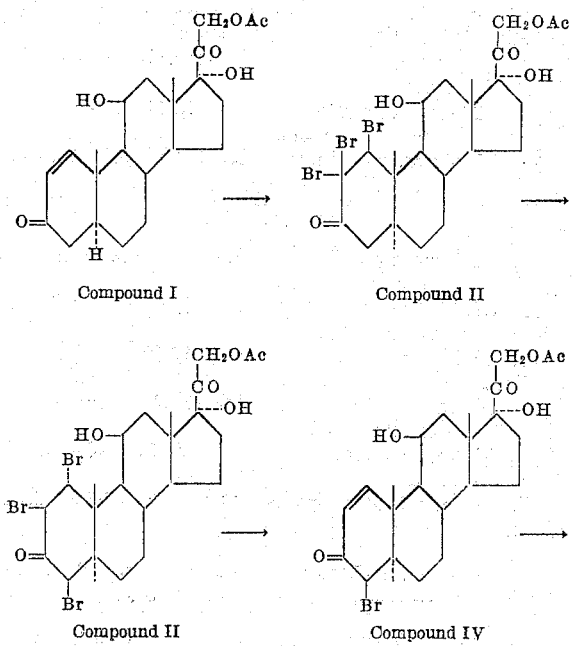

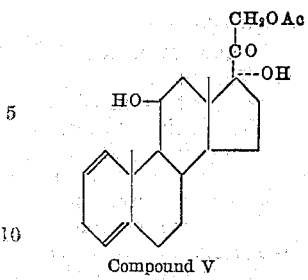

Compound V

The 1-allopregnene-11β,17α,21-triol-3,20-dione 21-acylates used as starting materials in the presently invented process are prepared by reacting the known allopregnane-11β,17α,21-triol-3,20-dione with an acylating agent e. g. a lower alkanoic anhydride such as acetic anhydride, propanoic anhydride, and the like, to produce the corresponding allopregnane-11β,17α,21-triol-3,20-dione 21-acylate, reacting this allopregnane-11β,17α,21-triol-3,20-dione 21-acylate with approximately one molecular equivalent of bromine to form 2-bromo-allopregnane-11β,17α,21-triol-3,20-dione 21-acylate, and reacting the latter compound with collidine thereby producing 1-allopregnene-11β,17α, 21-triol-3,20-dione 21-acylate or for example 1-allopregnene-11β,17α,21-triol-3,20-dione 21-(lower alkanoate), 1-allopregnene-11β,17α,21-triol-3,20-dione 21-acetate, 1-allopregnene-11β,17α,21-triol-3,20-dione 21-propionate, and the like.

The reaction between the bromine and the 1-allopregnene-11β,17α,21-triol-3,20-dione 21-acylate is conveniently conducted by adding two molecular equivalents of bromine dropwise to a solution containing one molecular equivalent of the steroid dissolved in an inert liquid medium as for example a lower alkanoic acid such as acetic acid. A small amount of a strong acid such as p-toluene sulfonic acid is usually incorporated in the reaction mixture as catalyst. Under these reaction conditions, and employing a reaction temperature of approximately 20° C., the bromination is complete in about 30–40 minutes. The reaction mixture is extracted with a halogenated hydrocarbon solvent such as chloroform; upon evaporation of the solvents there is obtained a 1,2,2-tribromo-allopregnane-11β,17α,21-triol-3,20-dione 21-acylate as for example the 21-(lower alkanoate), 21-acetate, 21-propionate and the like. These 21-esters are hydrolyzed by methanolic sodium methoxide solution to give 1,2,2-tribromo-allopregnane-11β,17α,21-triol-3,20-dione.

The isomerization of the 1,2,2-tribrominated intermediate is conducted by heating in solution in a lower alkanoic acid such as acetic acid at a temperature of about 70–100° C. for a period of about 10–15 minutes thereby forming a 1,2,4-tribromo-allopregnane-11β,17α, 21-triol-3,20-dione 21-acylate, e. g. the 21-(lower alkanoate), the 21-acetate, the 21-propionate, and the like. The latter compound can be recovered if desired by evaporating the lower alkanoic acid solvent in vacuo. The 21-ester thus obtained is hydrolyzed by methanolic sodium methoxide to form 1,2,4-tribromo-allopregnane-11β,17α, 21-triol-3,20-dione.

Alternatively, the alkanoic acid solution containing the 1,2,4-tribromo-allopregnane-11β,17α,21-triol 21-acylate is cooled to about room temperature, and to the solution is added an alkali metal iodide such as sodium iodide; the resulting mixture is vigorously agitated for a period of about five minutes at the end of which time dilute aqueous sodium thiosulfate solution is added to the reaction mixture thereby decolorizing the iodine liberated by the reaction. The reaction mixture is then extracted with a halogenated hydrocarbon solvent such as chloroform, and the chloroform extract is evaporated to give a 4-bromo-1-allopregnene-11β,17α,21-triol-3,20-dione 21-acylate e. g.

the 21-(lower alkanoate), 21-acetate, 21-propionate, and the like. These 21-esters are hydrolyzed by methanolic sodium methoxide to produce 4-bromo-1-allopregnene-11β,17α,21-triol-3,20-dione.

The 4-bromo compound is reacted with a base preferably a dialkyl amide such as dimethyl formamide in the presence of lithium chloride. The reaction is ordinarily carried out by heating the reactants at about 70–100° C. at which temperature the reaction is usually complete in about 2 hours. The reaction mixture is cooled, diluted with water, and the aqueous mixture extracted with a halogenated hydrocarbon solvent such as chloroform. Upon evaporation of the choroform extract, there is obtained 1,4 - pregnadiene - 11β,17α,21-triol-3,20-dione 21-acylate e. g. the 21-(lower alkanoate), 21-acetate, 21-propionate, and the like.

The following example illustrates a method of carrying out the present invention but it is to be understood that this example is given for purposes of illustration and not of limitation.

*Example*

To 202 mg. of 1-allopregnene-11β,17α,21-triol-3,20-dione 21-acetate in 10 ml. of chloroform is added 80 mg. of bromine in 2.5 ml. acetic acid. p-Toluene sulfonic acid in acetic acid is added (1.2 ml. 0.5 N). This is followed by 80 mg. of bromine and 41 mg. sodium acetate in 2.5 ml. acetic acid added dropwise over 30 minutes. After an additional 10 minutes, water is added and the aqueous mixture is extracted with chloroform. Upon evaporation of the chloroform extract, there is obtained 316 mg. of 1,2,2-tribromo-allopregnane - 11β,17α,21 - triol-3,20-dione 21-acetate. This 1,2,2 - tribromo - allopregnane - 11β,17α,21 - triol - 3,20-dione 21-acetate is dissolved in 10 ml. acetic acid, and the solution is heated on the steam bath 10 minutes. Upon evaporation of this solution, there is obtained 1,2,4 - tribromo - allopregnane - 11β,17α,21 - triol - 3,20-dione 21-acetate. The resulting solution is cooled to room temperature, 150 mg. sodium iodide is added, and the mixture is shaken for 5 minutes. To this solution is added a dilute aqueous solution of sodium thiosulfate, thereby decolorizing the iodine. The resulting mixture is extracted with chloroform and the chloroform extract is evaporated to give 4 - bromo - 1 - allopregnene-11β,17α,21 - triol - 3,20-dione 21-acetate. A mixture of this 4 - bromo - 1 - allopregnene - 11β,17α,21 - triol-3,20-dione 21-acetate, 100 mg. lithium chloride, and 5 ml. dimethyl formamide is heated on the steam bath for two hours; the reaction mixture is diluted with water, extracted with chloroform, and the chloroform extracts are evaporated to dryness, and the residual material is purified by chromatography on neutral alumina followed by recrystallization from acetone-petroleum ether to give substantially pure 1,4 - pregnadiene - 11β,17α,21-triol-3,20-dione 21-acetate; M. P. 238–243° C.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting 1-allopregnene - 11β,17α,21 - triol - 3,20 - dione 21-lower alkanoate with approximately two molecular equivalents of bromine to produce 1,2,2-tribromo-allopregnane-11β,17α,21-triol - 3,20 - dione 21-lower alkanoate, heating the latter compound to form 1,2,4-tribromo-allopregnane-11β,17α, 21 - triol - 3,20 - dione 21-lower alkanoate, reacting said 1,2,4 - tribromo - allopregnane - 11β,17α,21 - triol - 3,20-dione 21-lower alkanoate with an alkali metal iodide to produce 4-bromo-1-allopregnene-11β,17α,21-triol-3,20-dione 21-lower alkanoate, and reacting the latter compound with an organic base thereby forming 1,4-pregnadiene - 11β,17α,21 - triol - 3,20 - dione 21-lower alkanoate.

2. The process which comprises reacting 1-allopregnene - 11β,17α,21 - triol - 3,20 - dione 21-acetate with approximately two molecular equivalents of bromine to produce 1,2,2 - tribromo - allopregnane - 11β,17α,21-triol-3,20-dione 21-acetate, heating the latter compound to form 1,2,4 - tribromo-allopregnane-11β,17α,21-triol-3,20-dione 21-acetate, reacting said 1,2,4-tribromo-allopregnane-11β,17α,21-triol-3,20-dione 21-acetate with an alkali metal iodide to produce 4-bromo-1-allopregnene-11β,17α, 21 - triol - 3,20 - dione 21-acetate, and reacting the latter compound with an organic base thereby forming 1,4-pregnadiene - 11β,17α,21 - triol - 3,20 - dione 21-acetate.

3. The process which comprises reacting 1-allopregnene-11β,17α,21-triol-3,20-dione 21-lower alkanoate with approximately two molecular equivalents of bromine to produce 1,2,2-tribromo-allopregnane-11β,17α,21-triol-3,20-dione 21-lower alkanoate.

4. The process which comprises reacting 1-allopregnene-11β,17α,21-triol-3,20-dione 21-acetate with approximately two molecular equivalents of bromine to produce 1,2,2 - tribromo-allopregnane-11β,17α,21-triol-3,20-dione 21-acetate.

5. The process which comprises heating 1,2,2-tribromo-allopregnane-11β,17α,21-triol-3,20-dione 21-lower alkanoate to produce 1,2,4-tribromo-allopregnane-11β,17α,21-triol-3,20-dione 21-lower alkanoate.

6. The process which comprises heating 1,2,2-tribromo-allopregnane-11β,17α,21-triol-3,20-dione 21-acetate, at a temperature of about 70–100° C., to produce 1,2,4-tribromo-allopregnane-11β,17α,21 - triol - 3,20 - dione 21-acetate.

7. The process which comprises reacting 1,2,4-tribromo-allopregnane-11β,17α,21-triol-3,20-dione 21-lower alkanoate with an alkali metal iodide to produce 4-bromo-1-allopregnene-11β,17α,21-triol-3,20-dione 21-lower alkanoate.

8. The process which comprises reacting 1,2,4-tribromo-allopregnane-11β,17α,21-triol-3,20-dione 21-acetate with sodium iodide in acetic acid to produce 4-bromo-1-allopregnene-11β,17α,21-triol-3,20-dione 21-acetate.

9. The process which comprises reacting 4-bromo-1-allopregnene-11β,17α,21-triol-3,20-dione 21-lower alkanoate with an organic base in the presence of lithium chloride thereby forming 1,4-pregnadiene-11β,17α,21-triol-3,20-dione 21-lower alkanoate.

10. The process which comprises reacting 4-bromo-1-allopregnene-11β,17α,21-triol-3,20-dione 21-acetate with dimethyl formamide in the presence of lithium chloride thereby forming 1,4-pregnadiene-11β,17α,21-triol-3,20-dione 21-acetate.

11. 1,2,2-tribromo-allopregnane - 11β,17α,21 - triol - 3, 20-dione 21-lower alkanoate.

12. 1,2,2-tribromo-allopregnane - 11β,17α,21 - triol - 3, 20-dione 21-acetate.

13. 1,2,2-tribromo-allopregnane-11β,17α,21 - triol - 3, 20-dione.

14. 1,2,4-tribromo-allopregnane-11β,17α,21 - triol - 3, 20-dione 21-lower alkanoate.

15. 1,2,4-tribromo-allopregnane - 11β,17α,21 - triol - 3, 20-dione 21-acetate.

16. 1,2,4-tribromo-allopregnane - 11β,17α,21 - triol - 3, 20-dione.

17. 4-bromo-1-allopregnene - 11β,17α,21 - triol - 3,20-dione 21-lower alkanoate.

18. 4-bromo-1-allopregnene - 11β,17α,21 - triol - 3,20-dione 21-acetate.

19. 4-bromo-1-allopregnene - 11β,17α,21 - triol - 3,20-dione.

References Cited in the file of this patent

UNITED STATES PATENTS 2,735,855  Djerassi _____ Feb. 21, 1956